July 29, 1969

L. L. FRANK 3,458,232

COLLAPSIBLE CAMPER

Filed April 10, 1967

LESTER L. FRANK, INVENTOR

BY George R. Nimmer
ATTORNEY

LESTER L. FRANK, INVENTOR
BY George R. Nimmer
ATTORNEY

July 29, 1969  L. L. FRANK  3,458,232
COLLAPSIBLE CAMPER

Filed April 10, 1967  4 Sheets-Sheet 3

LESTER L. FRANK, INVENTOR

BY George R. Nimmer
ATTORNEY

July 29, 1969  L. L. FRANK  3,458,232
COLLAPSIBLE CAMPER
Filed April 10, 1967  4 Sheets-Sheet 4
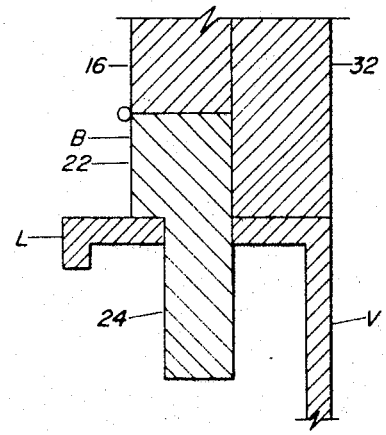
Fig. 7
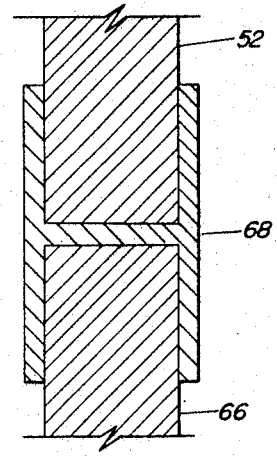
Fig. 9
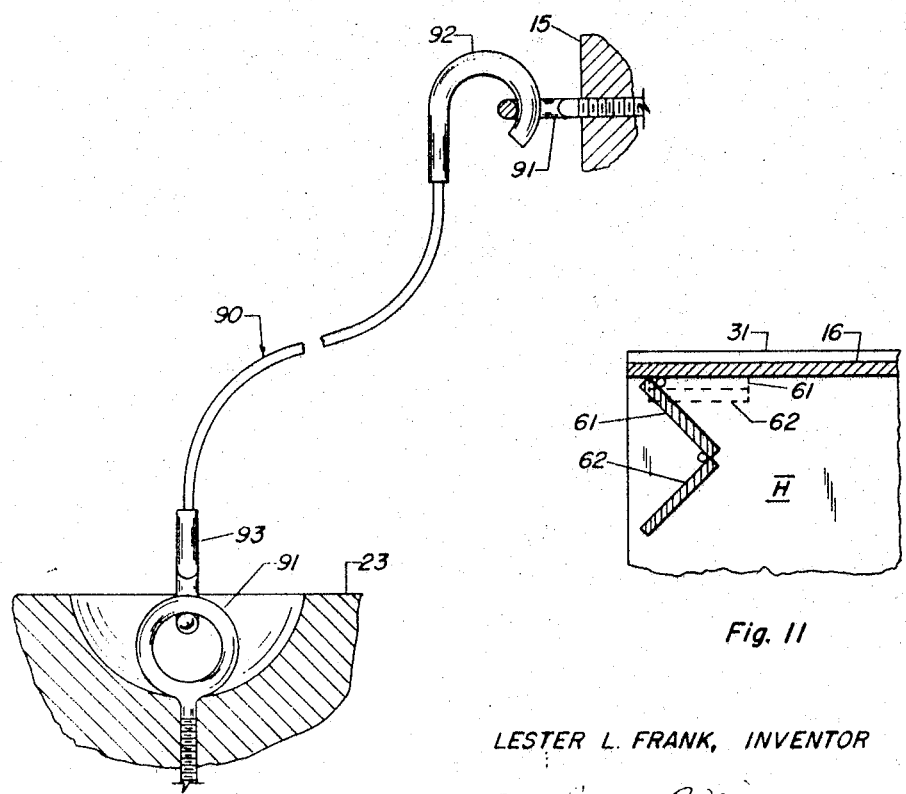
Fig. 10
Fig. 11
LESTER L. FRANK, INVENTOR
BY George R. Nimmer
ATTORNEY

United States Patent Office 3,458,232
Patented July 29, 1969

3,458,232
COLLAPSIBLE CAMPER
Lester L. Frank, 6201 Sprague,
Omaha, Nebr. 68104
Filed Apr. 10, 1967, Ser. No. 629,759
Int. Cl. B60p 3/34
U.S. Cl. 296—27    8 Claims

ABSTRACT OF THE DISCLOSURE

This invention relates to a collapsible camper or shelter in combination with an open-top box-like portable frame such as the rearward cargo box of a pick-up truck motor vehicle. In particular, this invention provides a collapsible camper that may be easily and quickly erected into an unusually spacious and strong structure having several internal convenience features.

---

There are two generic classes of portable camping shelters, the flexibe shell type and the rigid shell type. The flexible shell type is customarily provided of canvas, tarpaulin, and similarly flexible structural material. This invention is concerned with hardy rigid-shell shelters comprising rigid external structural members, and is not concerned with the relatively frail flexible shell variety.

Portable rigid shelters for vacationers, campers, and sportsmen are customarily mounted upon an open-top box-like frame such as a trailer or the cargo box of a pick-up truck. Most of the prior art shelters are permanently erected, and accordingly, have a vertical height exceeding about eight to ten feet, including the height of the frame's wheels. Permanently-erected lofty portable shelters invariably extend above the draying means e.g. an automobile sedan for a trailer or a pick-up truck having a rearward cargo box. Such lofty portable shelters create air-resistance to the forward travel of the draying means so as to reduce the draying means efficiency e.g. in terms of miles per gallon gasoline yield. Further, the lofty center-of-gravity for permanently-erected portable shelters, in combination with the air-resistance characteristics thereof, results in a dynamically-unstable and unsafe condition during its portability, thus providing steering problems for the driver-operator of the draying means, said operator being invariably a novice in pulling such lofty loads along a public roadway.

There are in the prior art erectable portable shelters that are collapsible into a portable form having a low center of gravity in order to provide more efficient and safer drayage thereof along a public roadway, especially by a novice driver-operator. However, the prior art collapsible-erectable portable shelters having rigid panels are invariably difficult and time-consuming to erect or collapsibly dismount, and it is difficult for these operations to be performed easily and safely by a single individual working without assistance. Further, many prior art collapsible portable structures require cumbersome internally-located hydraulic jacks and other bulky internal structural members to support the erected shelter, said internal columns and other structural members further complicating the erection and dismounting operations and also detracting from the available internal occupancy space of the erected shelter. Other prior art devices in the collapsed form do not provide any appreciable amount of storage space therein for other types of gear, cargo, and camping equipment. Many prior art devices are lacking or deficient in internal convenience devices such as storage space, bedding, sitting area, window space, and the like. Finally, those prior art collapsible shelters which are mounted to the cargo box of a pick-up truck are notably deficient in internal occupiable space as well as being cumbersome and difficult to erect and collapse.

It is accordingly the general object of the present invention to provide a portable collapsible shelter structure that overcomes the several disadvantages and deficiencies of the prior art.

It is another object of the present invention to provide a portable collapsible shelter for use in conjunction with an open-box frame such as a trailer or the cargo compartment of a pick-up truck that is exceedingly fast and easy to erect or collapse by an unassisted lone worker. It is an ancillary object to provide a portable shelter which may be safely erected and collapsibly dismounted without danger to a lone worker.

It is another object to provide a portable collapsible shelter that is structurally strong without the use of cumbersome and bulky internal support members.

It is yet another object to provide a portable collapsible shelter that is provided with abundant internal storage space both in its collapsed and erected forms and which is exceedingly versatile in use.

It is a further object to provide a portable collapsible shelter that has many novel internal convenience features including abundant storage space, bedding, sitting areas, and the like.

It is yet another object to provide a portable collapsible structure that is modifiable into alternate forms externally and internally, specifically for cargo carrying use and having a variety of selectable internal conveniences for passengers.

It is still another object to provide a portable collapsible structure that is economical to construct and to maintain.

It is another object to provide an exceedingly roomy and spacious portable collapsible shelter having adequate head room for a standing passenger even when used in combination with the arbitrary confines of a pick-up truck cargo box frame.

It is another object to provide a camper or shelter that is safely and easily transportable overland in both its erected and collapsed forms.

With the above and other objects and advantages in view, which will be more particularly pointed out as the description proceeds, the invention comprises the novel construction, arrangement, and combination of elements hereinafter set forth, and particularly pointed out in the appended claims, and illustrated in the accompanying drawing wherein like numbers refer to like parts in the several views, and in which:

FIGURE 7 is a sectional view taken along line 7—7 of FIGURE 2 to show the means for horizontally stabilizing the shell component to the frame, herein as a pick-up truck frame.

FIGURE 9 is a sectional elevational view taken along line 9—9 of FIGURE 2 to show the means for joining the pivotal gates to the transverse rear member of the erected shelter.

FIGURE 10 is a perspective view of the removable guy lines employed to temporarily laterally stabilize the erected shell portion of the shelter while remaining shelter portions are being manipulated by the operator.

FIGURE 11 is a sectional view taken along line 11—11 of FIGURE 4 to show the pivotal action of the gate members.

The collapsible shelter A of the present invention comprises a novel collapsible elongated external shell member S that is erectable into an upright shell having an inverted-U cross-sectional shape and two open ends including a transverse forward open end and a transverse rearward open end. Shell member S may be employed in either permanent or removable combination with a suitable frame member F comprising a pair of generally parallel upright opposed sidewalls V that are spaced apart a finite distance with a substantially horizontal floor H between said sidewalls V. The two open ends of shell member S may be suitably closed as with suitable transverse front and rear portions, depending upon the ultimate intended use for shelter A.

Figure 1:
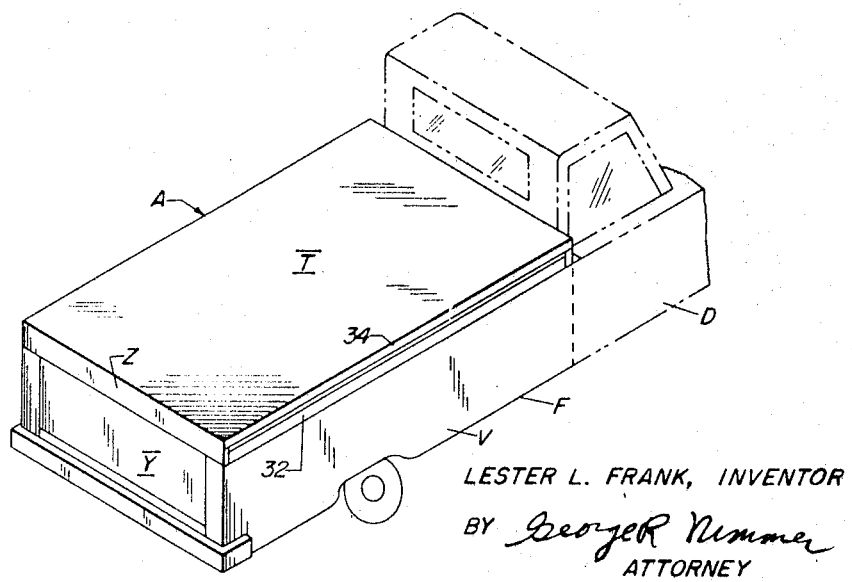
FIGURE 1 is a perspective view of the portable collapsible shelter in the collapsed form, said shelter being shown in the optional combination with the rearward open-top cargo box of a conventional pick-up truck.
Figure 2:
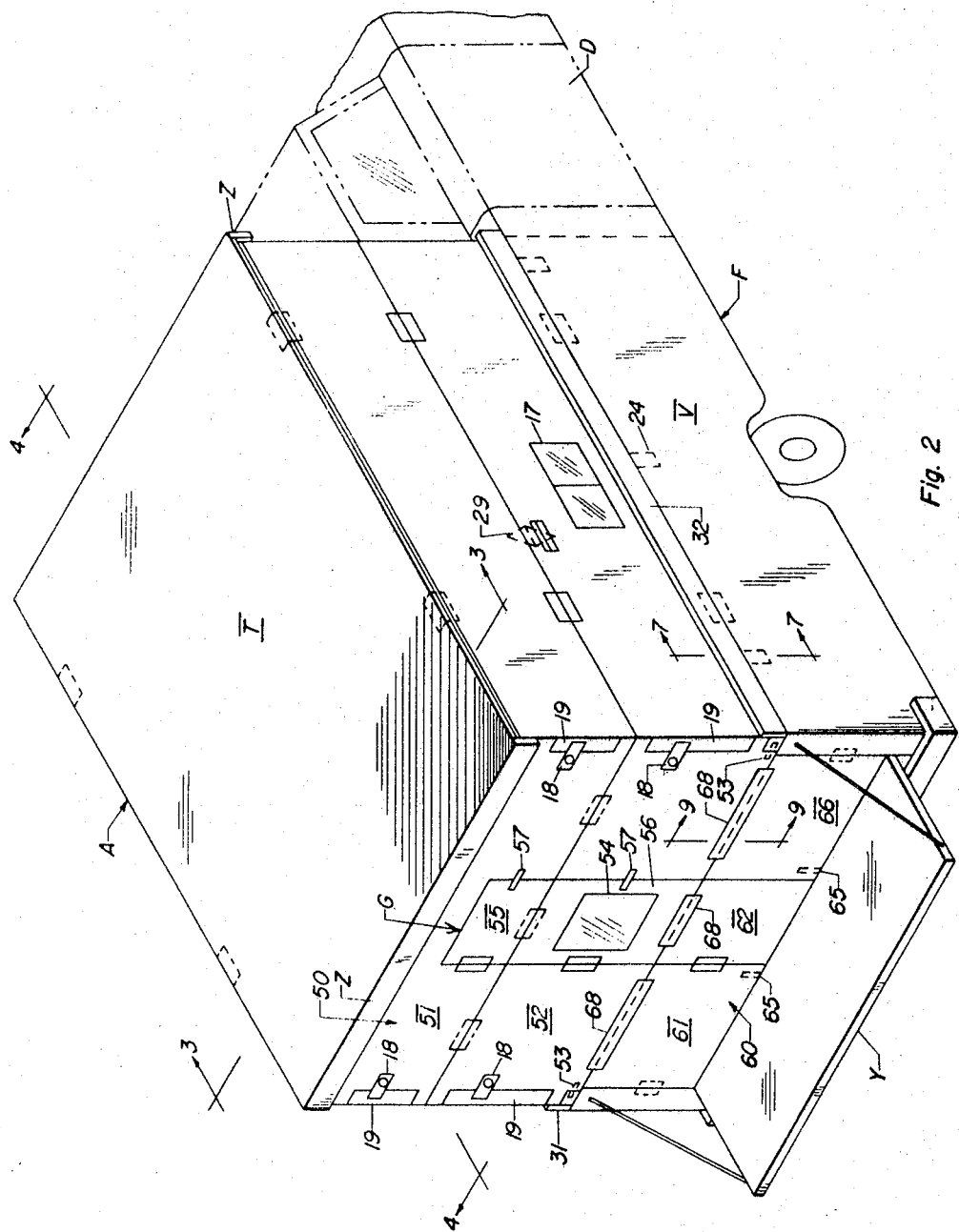
FIGURE 2 is a perspective view of the portable collapsed shelter in the erected form.

The preferred type frame member F is the rearwardly extending cargo box of a conventional pick-up truck D, the front or cab end of said pick-up truck being indicated in phantom line in FIGURES 1 and 2. The cargo box type frame F comprises a pair of generally parallel rigidly-upright opposed elongate sidewalls V, a substantially horizontal floor H positioned between upright elongate sidewalls V, and a rigidly-upright transverse front-wall W positioned immediately behind the truck cab; floor H, sidewalls V, and front-wall W are integrally joined together into a frame member F having an open top and an open rearward end. The open rearward end of the cargo-box frame F may be closeable as by means of a conventional transverse tailgate Y which is ordinarily pivotally attached to floor H between frame sidewalls V. Tailgate Y is shown open in FIGURE 2 wherein the collapsible shelter A is erected, and shown closed in FIGURE 1 wherein shelter A is downwardly collapsed into frame F for ready overland transportation.

Figure 3:
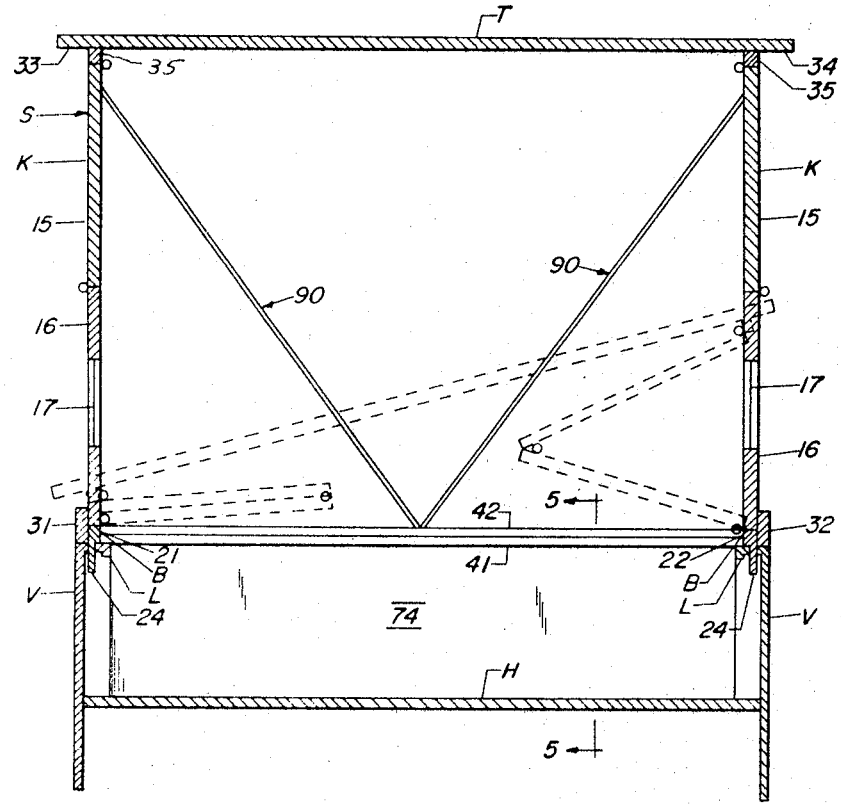
FIGURE 3 is a sectional elevational view of the transverse direction taken along line 3—3 of FIGURE 2.

Collapsible shell member S is an exceedingly important constituent of the present invention, and as can be seen in FIGURE 2 and 3, shell member S comprises two elongate opposed inwardly-foldable side members K and an intervening elongate roof member T that is pivotally connected to the upper elongate extremities of the opposed side members K. The lower elongate extremities of the shell inwardly-foldable side members K are pivotally associated with respect to the frame sidewalls V whereby the erectable shell S will downwardly collapse into frame F as indicated in FIGURE 1.

The upright or erected heights of the opposed side members K are substantially equal between the upper and lower elongate extremities thereof whereby the roof component T of shell S is maintained in a substantially horizontal position. Further, the elongate lengths of the rectangular sides K and roof T components of shell S are preferably substantially equal and coextensive between the transverse front-wall W and the open rearward end of cargo-box frame F. Each of the inwardly-foldable shell side members K comprises a pair of vertically-disposed pivotably-connected panels of substantially equal lengths including an upper side panel 15 and a lower side panel 16. Panels 15 and 16 are desirably of rectangular shape, and the vertical heights of the respective panels 15 and 16, as best seen in FIGURE 3, are preferably equal so as to afford the compact collapsibility of shell S as indicated in FIGURES 1 and 3.

FIGURES 2 and 3 aptly illustrate the pivotal characteristics of shell member S described in the previous two paragraphs. The pivotal characteristics may be afforded by means of conventional "piano hinges" comprising a pair of plates each being revolvably associated with an intervening hinge pin; accordingly, the hinges between the various elements are schematically indicated as referenceless rectangles in elevation e.g. FIGURES 3–4, and as referenceless small-circles in traverse section e.g. FIGURES 3–8 and 11. As shown by the appropriate positioning of the hinge means in FIGURES 2 and 3, the pivotal connection between side members panels 15 and 16 are adapted to move toward the interior of frame F but not outwardly of frame sidewalls V. Further, side members K of shell S are adapted to pivot inwardly of frame F by virtue of the proper position of the hinge means along roof T and frame sidewalls V.

The preferred manner of attaching shell member S to frame member F is by means of a substantially-horizontal U-shaped base member B, said base member B comprising two elongate rails 21 and 22 and an intervening transverse rail 23 integrally joined together in a U-shaped uniplanar relationship. Intervening transverse rail 23 is in a substantially perpendicular spaced-apart relationship with the parallel elongate rails 21 and 22, and the spacing of base member elongate rails 21 and 22 is substantially equal to the spacing for the upright sidewalls V of frame F. The lower elongate extremities of side members K are pivotably attached along the respective base rails 21 and 22 whereby the shell roof member T overlies the finite space between rails 21 and 22 and whereby each of the shell member lower side panels 16 is adapted to pivot inwardly of the base member B i.e. into the finite space between elongate rails 21 and 22. Thus, shell member S desirably integrally includes along the lower portion thereof the U-shaped horizontal base member B to facilitate attachment of shell B in overlying relationship with respect to the spaced-apart sidewalls V of a suitable frame member. For example, integral base member B facilitates attachment of shell S to the elongate upright sidewalls of a pick-up truck cargo box frame, especially for those pick-up truck models that are provided with downwardly-extending slots or cavities along the upper extremities of the cargo box upright opposed sidewalls. For such pick-up truck models, the under side of the base member elongate rails 21 and 22 is provided with downwardly-extending integral studs 24 at intervals equal to the spacing of the truck's downwardly-extending slots whereby the base member studs 24 extend into the truck's downwardly-extending slots to fix the horizontal or lateral position of shell base member B to the cargo-box frame, as shown in FIGURES 2, 3, 4, and 7. Affirmative vertical attachment of shell base member B may be promoted by means of a plurality of removable vertical bolts 25 spaced along the base member rails 21 and 22, said bolts 25 removably passing through inwardly-extending integral lugs 26 of rails 21 and 22 and through a separable block 27 on the underside of the inwardly-flanged lip L at the upper extremity of frame upright sidewalls V. There is a plurality of such combinations of integral lugs 26, separable blocks 27, and removable bolts 25 along the internal side of each base rail 21 and 22 to removably attach shell S to frame F, as exemplified in FIGURES 4 and 8.

There is opposed elevator means positioned externally of shell side members K to maintain the shell member roof T a finite distance above the frame upright sidewalls V when the shell S is in the downwardly-collapsed form so as to prevent undue stress upon the hinged connection between panels 15 and 16. Such opposed elevator means may comprise a pair of elongate boards 31 and 32 positioned along and attached to elongate rails 21 and 22, respectively, on the external side of said base member B. The height of said elevator boards 31 and 32 are substantially equal to each other and greater than the height of rails 21 and 22 whereby the upper elongate edges of elevator boards 31 and 32 abut the overhang portions 33 and 34, respectively, of shell roof T when shell S is in its downwardly collapsed form so as to maintain the downwardly-collapsed form of shell S in an elevated condition above frame F. Alternatively, the elevator boards, or similar elevator means may be attached to the underside of roof overhang portions 33 and 34, and said downward extensions for shell member roof T would abut the upper elongate extremities of frame sidewalls V externally of shell side members K to maintain the downwardly-collapsed form of shell member S in an elevated condition above frame F to prevent undue forces on the hinged connections between panels 15 and 16. In order to prevent undue stresses upon the hinged connections between roof T and side panels K, shell roof T desirably includes downwardly-extending opposed vertical portions 35 having a vertical height that exceeds the width of plate members 19.

There are grasping means accessible to an operator standing on the external side of the collapsed shell member S whereby he may exert an outward and an upward pull or force upon the inwardly-folded side members K to erect the shell member S. Preferably, such grasping means comprises in combination the outwardly-extending overhang portions 33 and 34 of shell member roof T together with a manually-engageable portion on the lower-side panels 16. Such manually-engageable portion on panels 16 might be as a recessed handle fixture on the external side of panels 16 or as a slidably closeable window opening 17 for said panels 16. Thus, to erect the downwardly-collapsed form of shell S, the operator stands along one of the two opposed frame sidewalls V, pushes upwardly on roof overhang portion (e.g. 33) to partially unfold the adjacent side member K and expose the external side of lower side panel 16 (as indicated in phantom line in FIGURE 3), then manually engages the manually-engageable portion on lower side panel 16 e.g. the periphery of opened window 17 or a recessed handle (not shown), and finally exerts an outward pull on lower side panel 16 to completely pivotally unfold side member K causing both member panels 15 and 16 to be vertically aligned. There are rigidifying means to uprightly rigidify the vertically aligned panels 15 and 16, as for example, by means of a spring-loaded hinge lock 29 on the interior side of shell side members K at the juncture of panels 15 and 16. The rigidifying means are releasable from the external side of the erected shell to facilitate re-collapsing thereof, as for example, by positioning the rigidifying means adjacent to window 17, or by means of an actuation-cord (not shown) attached to the hinge-lock 29 and said cord passing externally through side member K. The operator repeats the erection procedure of the instant paragraph at the opposite side of shell S e.g. adjacent to roof overhang portion 34, to complete the erection of shell S.

Having now described the erection and collapsible features of shell member S in combination with a suitable frame, the provision of desirable transverse front and rear closures for the open-ended shell will now be described. It is important that the temporarily rigidified shell side members K be further stabilized during the installation of said end closures, and for this purpose, the removable guy lines 90 of FIGURE 10 may be advantageously employed. Specifically, as is shown in FIGURE 3, two flexible guy lines 90 are temporarily and removably attached between a respective upper side panels 15 and a horizontal member e.g. a medial position of cross-bar 23 until the transverse rear member 50 is erected into place; thereafter, the guy wires removed until such time as it is desired to downwardly collapse the shelter A, at which time the guy wires are re-installed before the shell is re-collapsed. Each guy line 90 is provided with terminal fasteners, herein as hooks 92 and 93 on the respective ends of the flexible guy line. The first end 92 of guy line 90 is removably attached to shell member upper side panels 15 as by means of an eye-type fastener 91 on the inner surface of panels 15. The second end 93 of guy line 90 is removably attached to transverse cross-bar 23 as by means of a similar eye-type fastener 91 on the upper side of said cross-bar 23.

The transverse front member 40 for the collapsible shelter A is transversely disposed across the forward open end of erected shell member S. Front member 40 comprises a pair of vertically disposed pivotally attached panels 41 and 42 of substantially equal lengths, said length being effectively equal to the transverse length of the forward end opening for the erected shell S. Specifically, the vertically disposed panels 41 and 42 of transverse front member 40 are of substantially congruent rectangular shape whereby each panel 41 and 42 provides essentially one-half the vertical height of erected front member 40. Lower-front panel 42 is pivotably attached along the upper rearward transverse extremity of base member intervening rail 23 whereby the entire front member 40 is adapted to pivot rearwardly of said intervening rail 23. The lower transverse extremity of upper front planel 41 is pivotably attached to the upper transverse extremity of lower front panel 42 whereby the upper front panel 41 will pivot inwardly of lower front panel 42 as indicated in phantom line in FIGURE 4, and front member 40 will downwardly collapse along with shell member S to horizontally lie between shell member roof T and base member B. The aggregate thickness of panels 41 and 42 is less than the vertical height of base member intervening rail 23, and lower panel 42 is preferably not below rail 23 so that the horizontally collapsed panels 41 and 42 will not interfere with the downward collapsibility of shell member S. The erected transverse front member 40 is maintained in its erected form so long as desired as by any conventional means, as for example, the combination of latch 18 and plate 19 which is also similarly employed for transverse rear member 50 hereinafter to be described. Lower front panel 42 is provided with a central transparent window 44 which is in horizontal alignment with both the truck cab rear window and with central window 54 in shelter rearward member 50 so as to provide unobstructed rear-view vision for the truck operator.

The rear-end closure for the open-ended erected shell S may comprise two vertically disposed independent constituents including a transverse rearward member 50 for the upper part and a pair of collinear gates 60 and 66 for the lower part of said rear end closure. Collinear gates 60 and 66 transversely enclose the rearward confines of shelter A defined by the full extent of frame upright sidewalls V and the frame floor H, and in the case of a pick-up truck cargo box frame, the gates are positioned immediately forward of and substantially parallel to tailgate Y. Upright extremities of said vertical gates 60 and 66 are pivotably attached to the respective adjacent frame sidewalls V with appropriate hinge means (e.g. the piano type hinges which pivotably associate the various elements of shell member S), whereby the gates 60 and 66 will pivot forwardly into frame F to the extent that said gates will assume substantial parallelism with upright sidewalls V. Both gates are provided with conventional spring-loaded vertical stop-pins 65 which are adapted to engage recessed portions of frame floor H whereby said stop-pins 65 are adapted to releasably maintain gates 60 and 66 in collinear relationship transversely across the rearward portion of frame F opposite to forward wall W. First gate 60 is transversely longer than second gate 66. First gate 60 comprises two distinct side-by-side sections including first section 61 that is pivotably attached to frame upright sidewall V and a second section 62 that is pivotably attached to first section 61. As alluded to in FIGURE 2 and shown even more clearly in FIGURES 4 and 11, second section 62 is adapted to fold in parallelism against first section 61 and both sections 61 and 62 are adapted to assume a folded parallel relationship with frame upright sidewall V.

The upper portion for the shelter's transverse rearward end closure between gates 60 and 66 and the roof T of erected shell S is provided by means of foldable transverse upright rearward member 50. Foldable rearward member 50 comprises a pair of vertically disposed pivotably attached panels 51 and 52 having transverse lengths that are substantially equal to each other and to the distance between vertical side members K of erected shell S. Specifically, the vertically disposed panels 51 and 52 of transverse rear member 50 are of substantially congruent rectangular shape whereby each panel 51 and 52 provides essentially one-half the vertical height of erected rear member 50. Lower rear panel 52 of rear member 50 is desirably removably pivotably attached to the respective elongate rails 21 and 22 as by means of slidable pins 53 that slidably extend into transverse perforations of said rails 21 and 22. The vertically-aligned panels 51 and 52 of rear member 50 are maintained across the vertical rearward opening defined by shell roof T, shell side members K and gates 60 and 66 as by means three slidable H-irons 68, by the 18–19 latch-plate combination, and by the depending rearward flange Z of shell roof T. Specifically, as exemplified in FIGURE 9, three removably slidable H-irons 68 are slidably engaged between lower-rear panel 52 and the gate elements 61 and 62 and 66, respectively. The upper and sideward extremities of rear member 50 are attached to shell member S by four pairs of latch-plate combinations 18 and 19 as shown in FIGURE 2 together with upper-rear panel 51 abutting downwardly-depending roof flange Z, in similar fashion as with front member 40. As pointed out previously, lower-rear panel 52 includes a central window 54 that is in horizontal alignment with front member window 44 and with the rear window of the truck cab. Upon removal of the three slidable H-irons 68 and the release of latches 18, as indicated in phantom line in FIGURE 4, upper-rear panel 51 will pivot inwardly of lower-rear panel 52, and lower-rear panel 52 will thereafter pivot about the slidable pins 53. Thus, rear member 50 will downwardly collapse along with shell member S to horizontally lie between shell member roof T and gates 60 and 66 in the shelter's collapsed condition.

As can be seen in FIGURE 2, the lower-front and lower-rear panels 51 and 52 include pivotably associated intermediate sections 55 and 56, respectively, to complete the rearward door G for shelter A. Specifically, upper-rear panel 51 has a pivotably associated section 55 that is lockable with respect to the remainder of panel 51 with a slidable bolt 57, and lower rear panel 52 has a pivotably associated section 56 that is similarly lockable to the remainder of panel 52 with another slidable bolt 57. Section 56 is pivotably attached to and firmly abuts section 55. When bolts 57 are disengaged, the vertically aligned sections 55, 56, and 62, together with an H-iron 68, provide the rearward door G for shelter A.

The shelter A comprises as an optional internal feature a versatile bench member 70 that can be readily selectively adapted into either a divan or a bed form. Bench member 70 comprises a cross-bar 71 positioned transversely of frame F near the forward end thereof, said cross-bar 71 extending between frame upright sidewalls V. As can best be seen in FIGURES 4–6, transverse cross-bar 71 is preferably disposed immediately to the rear of and substantially parallel to frame upright front end W. Cross-bar 71 may be disposed immediately beneath the rearwardly-extending lip for upright front end W, and upon which said lip intervening base rail 23 rests, as by means of vertical threaded bolts passing through intervening rail 23, the rearwardly-extending lip of front end W, and into cross-bar 71. Thus, cross-bar 71 and intervening rail 23 are held removably together in an overlying parallel relationship. The upper-rearward transverse corner 72 of cross-bar 71 is suitably notched as shown and for reasons to be explained subsequently.

Figure 4:
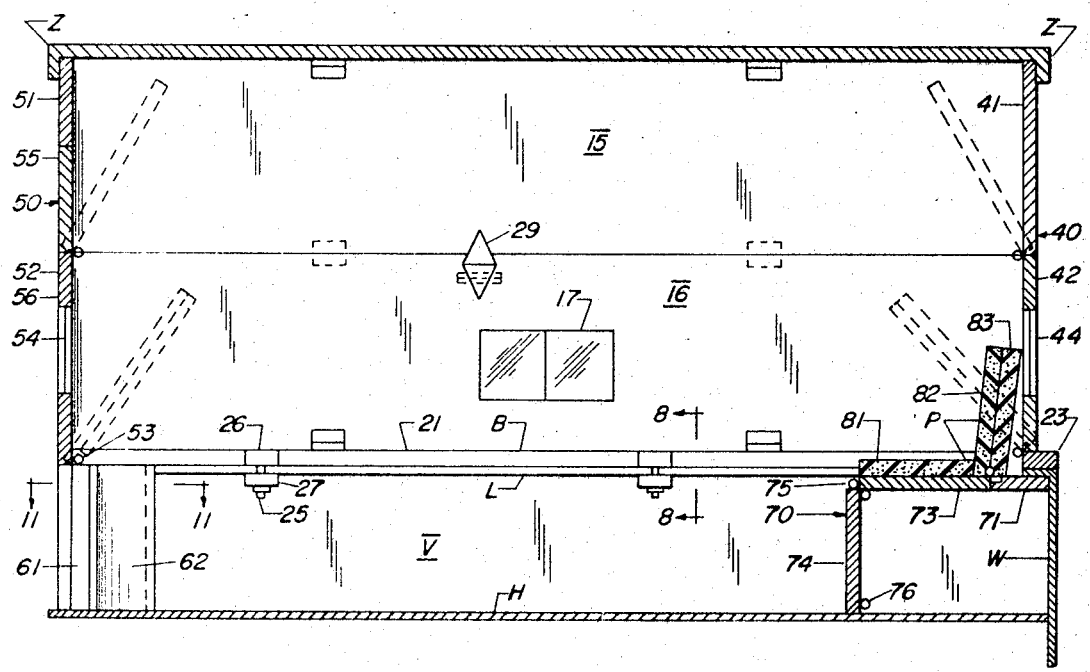
FIGURE 4 is a sectional elevational view in the elongate direction taken along line 4—4 of FIGURE 2.
Figure 6:
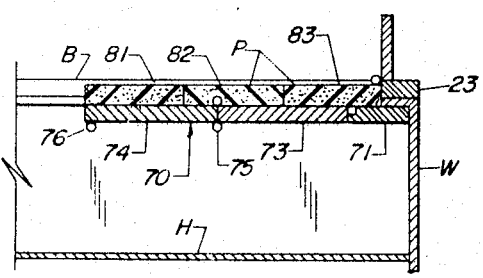
FIGURE 6 is a sectional view similar to FIGURE 5 showing the bench member in the bed form.
Figure 5:
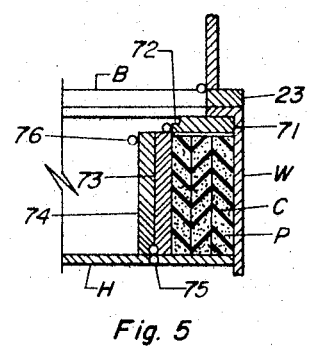
FIGURE 5 is a sectional elevational view taken along line 5—5 of FIGURE 3 to show the novel internal bench member of the present invention.
Figure 8:
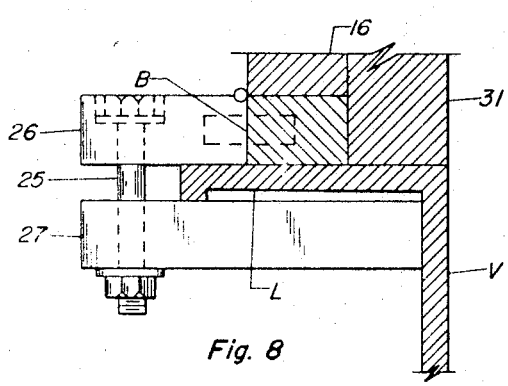
FIGURE 8 is a sectional view taken along line 8—8 of FIGURE 4 to show a means for vertically stabilizing or locating the collapsible shell component to pick-up truck frame.

Bench member 70 additionally comprises a pair of pivotably-associated transverse panels 73 and 74 said panels 73 and 74 being attached together with a double-action hinge 75, said double-action hinge 75 being appropriately schematically indicated as a pair of circles on both sides of the 73–74 juncture in FIGURES 4–6. The first bench panel 73 is pivotably attached to cross-bar 71 immediately beneath the transverse notch 72 thereof, and the adjacent transverse edges of first bench panel 73 and second base panel 74 are pivotably attached together with the double-action hinge means 75 already referred to. The aforesaid specified pivotal relationship of elements 71, 73, and 74, affords multi-purpose utility for said bench member 70. For example, as shown in FIGURE 5, the panels 73 and 74 may be positioned in upright parallelism with respect to each other, in parallelism with respect to frame front wall W and to transverse front member 40, and substantially perpendicular to frame floor H and to cross-bar 71. Thus, there results a stowage compartment C as shown in FIGURE 5 defined by elements H, 73, W and 71 for the storage of portable resilient padding P. As shown in FIGURE 4, first bench panel 73 may assume a parallel relationship with frame floor H by virtue of second bench panel 74 being perpendicular with frame floor H and first bench panel 73, and the resulting configuration provides a divan type furniture article. Finally, as shown in FIGURE 6, both bench panels 73 and 74 may be elevated in substantial parallelism above frame floor H as by means of a convenient lateral bar or bracket 76 attached either to the respective frame sidewalls V or to panel 74. As will be described in greater detail in the next paragraph, padding P is suitably employed with the FIGURE 4 divan form and with the FIGURE 6 bed form of bench member 70.

Padding P preferably comprises a resiliently deformable material e.g. foam rubber, natural feathers, and the like. Further, for ease of storage of the padding P as shown in FIGURE 5, and for use in the divan and bed furniture forms, padding P preferably comprises three distinct pivotably-connected rectangular sections 81, 82, and 83, each section being of substantially equal width and thickness as shown in FIGURES 4–6 and of substantially equal transverse lengths along frame front wall W. With such a padding P comprising three pivotably connected sections 81–83, the padding P may be removably employed wtih the divan type configuration of FIGURE 4, with the bed type configuration of FIGURE 6, and within the storage compartment C of FIGURE 5.

Operation of the collapsible shelter A has been already alluded to but will now be summarized in order, commencing from the collapsed form thereof shown in FIGURE 1. First, the operator stands along one of the frame upright sidewalls V, pushes upwardly on shell member roof T at the upper end of elevator 34 with the palm of his hand to expose the external surface of lower side panel 16. Then, the operator manually engages the grasping means e.g. the window opening 17, and pulls outwardly on lower side panel 16 to vertically align pivotably connected panels 16 and 15 whereby the automatic hinge lock 29 releasably maintains said panels 16 and 15 in vertical alignment. The same procedure is repeated at the opposite upright sidewall V whereby shell member S becomes erected with the opposed side members K being upright with respect to frame floor H and the shell member roof T being substantially parallel to frame floor H.

Next, the operator lowers the frame tailgate Y, and physically stands thereon for the purpose of erecting transverse rear member 50. The operator erects rear member 50 by vertically aligning the lower-rear panel 52 and the upper-rear panel 51 and locking them in the vertical position by means of the latch 18 and plate 19. Door G is formed by freeing pivotably-associated sections 55 and 56 by means of external fastener-bolts 57. Gates 60 and 66 are then put into the collinear positions as shown in FIGURE 2 utilizing stop pins 65. Section 62 of gate 60 is then pivoted rearwardly and an H-iron 68 is slidably inserted between elements 52 and 61 and another H-iron 68 is similarly slidably inserted between elements 52 and 66 whereby all but the door G of rearward end 50 is appropriately uprightly rigidified. The door G is completed by sliding a third H-iron 68 between elements 56 and 62. The operator then enters the erected shell member S through door G and removes guy wires 90 without chance of injury to himself inasmuch as shell S has already been stabilized with elements 50, 60, 66, and 68. Finally, the operator erects front member 40 by vertically aligning the lower-front panel 42 and the upper-front panel 41 and locking them in vertical position by means of latch 18 and plate 19.

To remove padding P from storage compartment C of FIGURE 5, the operator pivots both bench panels 73 and 74 for more than 90°, to gain access to the stored padding P, and for this degree of pivotal motion for both bench panels 73 and 74, the transverse notch 72 of cross-bar 71 is needed.

To recollapse the erected structure of FIGURES 2–4, the procedure of the preceding three paragraphs is reversed. The locking means e.g. 29, for shell side members K is released by the operator manually entering the structure through windows 17, or alternatively, by means of a release cable (not shown) passing from the rigidifying means 29 through the side member K.

The collapsed form of the shelter A shown in FIGURE 1 can be used as a pick-up truck when the tailgate Y is opened and the gates 60 and 66 are opened as shown in FIGURE 11.

From the foregoing, the construction and operation of the collapsible camper or shelter will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A collapsible camper shelter mounted in combination with a frame member that comprises a pair of generally parallel upright opposed elongate sidewalls that are spaced apart a rigid finite distance, said collapsible camper structure comprising:

(A) a substantially horizontal elongate U-shaped base member comprising two elongate opposed rails and a shorter intervening transverse rail attached together in a U-shaped relationship wherein the two elongate rails are in substantial parallelism and spaced apart a rigid finite distance that is substantially equal to the spacing of the frame upright opposed sidewalls, (B) a collapsible elongate external shell member that is erectable into an upright elongate shell-like structure having an inverted-U cross-sectional shape and having open transverse forward and rearward ends, said external shell comprising two elongate opposed inwardly-foldable side members and an intervening elongate normally-horizontal roof member that is pivotably connected to the upper elongate extremities of the opposed side members, each of the said opposed side members comprising a pair of vertically disposed panels of substantially equal elongate lengths including an upper-side panel and a lower-side panel, the lower-side panel of the respective side members being pivotably attached to the respective elongate rails of the U-shaped horizontal base member whereby the shell member roof overlies the space between the base member opposed elongate rails and whereby each of the lower-side panels of the side members is adapted to pivot from its associated base member elongate rail toward the interior of said U-shaped horizontal base member, the upper-side panel of the respective side members being pivotably attached along the elongate extremities of the roof member whereby each of the upper-side panels is adapted to pivot toward the interiors of said roof member and of said U-shaped horizontal base member, the adjacent elongate extremities of the upper-side panel and of the lower-side panel of each inwardly-foldable side member being pivotably attached whereby the said attached adjacent elongate extremities are adapted to move inwardly of said U-shaped horizontal base member to downwardly collapse said shell member as the side members are pivoted toward each other with respect to the roof and to the U-shaped base member elongate rails, said inwardly-foldable side members including integrally attached rigidifying means to uprightly rigidify the side members of the erected shell, said rigidifying means being releasable from the external side of the erected shell, means accessible to the external side of the collapsed shell member to permit an outward and upward pull to be exerted upon the inwardly-foldable side members of the collapsed shell member, and opposed elevator means along the respective base member elongate rails to maintain the shell member roof a finite distance above the base member elongate rails when the shell member is in its downwardly collapsed form.

2. The collapsible camper shelter of claim 1 wherein the horizontal base member opposed elongate rails have substantially co-planar lower surfaces whereby the base member opposed elongate rails are adapted to rest along the upper elongate extremities of the frame opposed elongate upright sidewalls; wherein each of the base member opposed elongate rails has a plurality of downwardly-extending vertical studs adapted to extend downwardly into vertical cavities of the frame opposed elongate upright sidewalls; wherein the shell member roof has a pair of opposed downwardly-depending elongate portions, said downwardly-depending elongate portions being spaced a finite distance inwardly of and substantially parallel to the elongate extremities of the roof member whereby the finite distance between each downwardly-depending elongate portion and the adjacent elongate roof extremity provides a roof overhang portion; wherein the upper-side panel and the lower-side panel of the side members are of congruent rectangular shape; wherein the upper-side panel of the respective side members is pivotably attached to the downwardly-depending elongate portion of the roof member; wherein each lower-panel of the inwardly-foldable side members comprises an openable window; and wherein the opposed elevator means are attached along and extend above the respective elongate rail components of the U-shaped horizontal base member whereby the roof overhang portions abut the elevator means when the shelter is in the downwardly collapsed form.

3. The collapsible camper shelter of claim 2 wherein there are guy wires removably attached between the respective upper-side panels of the shell members and the intervening transverse rail of the U-shaped horizontal base member; wherein the open forward end of the erected shell member is closeable by means of a transverse front member comprising a pair of vertically disposed attached panels of substantially equal transverse lengths including an upper-front panel and a lower-front panel, the lower transverse length of lower-front panel being pivotably attached to the intervening transverse rail of the base member whereby the front member is adapted to pivot inwardly of the base member, the upper-front panel being pivotably attached to the lower-front panel whereby the upper-front panel is adapted to pivot inwardly of the base member when the lower-front panel is upright with respect to the base member intervening rail; and wherein the open rearward end of the erected shell member is closeable by means of a foldable transverse rearward member, said rearward member including an opening covered by a door pivotably attached to the rearward member to permit ingress into the erected camper shelter.

4. A collapsible camper in combination with a frame member, said frame member comprising a substantially horizontal floor, a pair of generally parallel rigidly-upright opposed elongate sidewalls, and a rigidly-upright transverse front-wall, said floor, opposed sidewalls, and front-wall, said floor, opposed sidewalls, and front-wall being integrally joined together into a frame member having an open top and an open rearward end, said collapsible camper comprising:

(A) a collapsible elongate external shell member that is erectable into an upright shell-like structure having an inverted-U cross-sectional shape and having transverse open forward and rearward ends, said external shell comprising two elongate opposed inwardly-foldable side members and an intervening elongate roof member that is pivotably connected to the upper elongate extremities of the opposed side members, the upright height of the opposed side members of the erected shell being substantially equal whereby the shell roof member is maintained in a substantially horizontal position, each of the side members comprising a pair of vertically disposed panels of substantially equal lengths including an upper-side panel and a lower side panel, the lower-side panel of the respective side members being coextensive along and pivotably attached to the respective opposed sidewalls of the frame member whereby the shell member roof overlies the frame member floor between the frame member opposed sidewalls and whereby each of the lower-side panels of the shell member is adapted to pivot from its associated frame member upright sidewall toward the interior of said frame member, the upper-side panel of the respective side members being pivotably attached a given distance from and along the elongate extremities of the roof member whereby each of the upper-side panels is adapted to pivot from the roof member inwardly of the frame member sidewalls, the adjacent elongate extremities of the upper-side panel and of the lower-side panel of each inwardly-foldable side member being pivotably attached whereby the said adjacent elongate extremities are adapted to move inwardly of said frame member sidewalls to collapse said shell member downwardly toward the frame member floor as the side members are pivoted toward each other with respect to the roof and to the frame upright sidewalls, said inwardly-foldable side members including integrally attached rigidifying means to uprightly rigidify the side members to erect the shell member, said rigidifying means being releasable from the external side of the erected shell to collapse said shell downwardly toward the frame member floor, means accessible to the external side of the collapsed shell member to permit an outward and upward pull to be exerted upon the inwardly-foldable side members of the collapsed shell member, and opposed elevator means along the frame upright sidewalls to maintain the shell member roof a finite distance above the frame upright sidewalls when the shell member roof is in the downwardly collapsed form;

(B) a transverse front member comprising a pair of vertically disposed pivotably attached panels of substantially equal transverse lengths including an upper-front panel and a lower-front panel, said transverse front member being adapted for upright attachment over the forward open transverse end of the erected shell between said shell and the frame member front-wall, and means for removably attaching guy lines between the respective upper-side panels and the frame member to stabilize the erected shell for installation of the transverse front member.

(C) a pair of collinear opposed upright gates transversely attached over the rearward open end of the frame member between the floor and upright sidewalls thereof, the upper ends of said upright gates being of substantially equal elevation with respect to each other and to the upper end of the frame sidewalls, the first of said upright gates comprising a pivotably attached vertical section along the entire upright height of said first upright gate, and (D) a foldable transverse upright rearward member that is transversely attached over the transverse rearward end of the erected shell between said shell and the pair of collinear upright gates, said upright rearward member including an opening covered by a door to permit ingress into the erected camper, said opening being in vertical alignment with the pivotal vertical section of the first upright gate.

5. The collapsible camper shelter of claim 4 wherein the shell member roof has a pair of opposed downwardly-depending elongate portions, said downwardly-depending elongate portions being spaced a finite distance inwardly of and substantially parallel to the elongate extremities of the roof member whereby the finite distance between each downwardly-depending elongate portion and the adjacent elongate roof extremity provides a roof overhang portion; wherein the upper-side panel and the lower-side panel of the respective side members are of congruent rectangular shape; where in the upper-side panel of the respective side members is pivotably attached to the downwardly-depending elongate portion of the roof member; wherein each lower-panel of the inwardly-foldable side members comprises an openable window; and wherein the opposed elevator means are attached along the upper elongate extremities of the respective upright side members of the frame member whereby the roof overhang portions abut the elevator means when the shelter is in the downwardly collapsed form.

6. The collapsible camper shelter of claim 5 wherein the frame member is the rearwardly-extending open-top cargo box of a pick-up truck having a floor, said pick-up truck including an operator's cab at the forward end, said operator's cab having a transparent window at the rearward side thereof, the upper elongate extremities of the frame's opposed elongate upright sidewalls being provided wth a plurality of downwardly extending vertical cavities therealong; wherein there exists at the juncture between the shell member and the frame member a substantially horizontal U-shaped base member comprising two elongate opposed rails and a shorter transverse intervening rail attached together in a U-shaped relationship whereby the two elongate rails are in substantial parallelism and spaced apart a rigid finite distance that is substantially equal to the spacing of the frame's upright opposed sidewalls; wherein each of the base member opposed elongate rails has a plurality of downwardly-extending studs that extend downwardly into the vertical cavities of the frame's upright opposed sidewalls; wherein the lower-side panel of the respective side panels is pivotably attached to the respective elongate rails of the U-shaped horizontal base member whereby the shell member roof overlies the space between the base member opposed elongate rails and whereby each of the lower-side panels of the side members is adapted to pivot from its associated base member elongate rail toward the interior of the frame member; wherein the lower-front panel of the transverse front member has a transparent window in horizontal alignment with the truck cab rearward window; and wherein the rearward transverse member has a transparent window in horizontal alignment with the truck cab rearward window and also in horizontal alignment with the transverse window of the lower-front panel of the transverse front member.

7. The collapsible shelter camper of claim 6 wherein the transverse rear member comprises a pair of vertically disposed attached panels of substantially equal transverse lengths including an upper-rear panel and a lower-rear panel, the lower-rear panel being removably pivotably attached to the opposed elongate rails of the horizontal U-shaped base member whereby the transverse rear member is adapted to pivot toward the truck cab, the upper-rear panel being pivotably attached to the lower rear panel whereby the upper-rear panel is adapted to pivot toward the truck cab when the lower-rear panel is upright with respect to the horizontal U-shaped base member; and wherein the lower-front and lower-rear panels each include pivotably associated intermediate sections, the two intermediate sections being vertically aligned to provide an entrance to the erected camper shelter.

8. The collapsible shelter camper of claim 6 wherein the cargo-box frame includes an upright front-wall immediately to the rear of the operator's cab, said frame front-wall having at the upper end thereof a rearwardly-extending horizontal lip; and wherein a dual-panel bench member is attached along the horizontal lip of the frame front-wall, said bench member comprising a transverse cross-bar portion attached along the horizontal lip of the frame front-wall and a pair of transverse panels connected together by means of a double-action hinge, the first of said pair of bench panels being pivotably attached to the cross-bar portion rearwardly remote of the frame front-wall whereby a storage compartment exists between the frame front-wall and the pair of panels when said pair of panels are parallel to the frame front-wall, said frame member including means to maintain said pair of panels in parallelism with the frame floor to provide a bed-like furniture article within the erected camper.

References Cited
UNITED STATES PATENTS

| | | | |
|---|---|---|---|
| 3,145,044 | 8/1964 | Harrison | 296—27 X |
| 3,286,414 | 11/1966 | Harrison | 52—66 |

PHILIP GOODMAN, Primary Examiner

U.S. Cl. X.R.

52—66